United States Patent Office 3,836,507
Patented Sept. 17, 1974

3,836,507
FLAME RESISTANT FINISH OF COMBUSTIBLE MATERIALS PREPARED FROM PHOSPHOROUS COMPOUNDS, ALDEHYDES AND KETONES
Masao Yoshizawa, Omiya, Takeo Mikami, Kawagoe, and Nobuo Kobayashi and Akira Iida, Mikawamachi, Japan, assignors to Dainippon Ink & Chemicals, Inc., Tokyo, and The Dainippon Ink Institute of Chemical Research, Saitama Pref., Japan
No Drawing. Original application Aug. 21, 1970, Ser. No. 66,153, now Patent No. 3,760,037. Divided and this application Jan. 30, 1973, Ser. No. 328,151
Claims priority, application Japan, Aug. 25, 1969, 44/66,501
Int. Cl. C07f 9/40; D06c 27/00
U.S. Cl. 260—64                                                   8 Claims

ABSTRACT OF THE DISCLOSURE

Phosphorus-containing oligomers or polymers useful as flame-resistant substances are obtained by reacting a tertiary phosphite (A) of the general formula:

$$(R_1O)_3P, \tag{A}$$

a dialkyl phosphite halogenide (B) of the general formula:

$$(R_2O)_2PX, \tag{B}$$

a cyclic halogenophosphite (C) of the general formula:

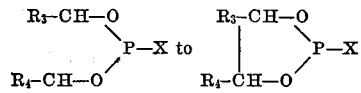

an aldehyde (D) of the general formula:

$$R_8CHO \tag{D}$$

and a ketone (E) of the general formula:

$$R_9-\underset{\underset{O}{\|}}{C}-R_{10} \tag{E}$$

wherein $R_9$ to $R_{10}$ and X are as defined below.

BACKGROUND OF THE INVENTION

Field of the Invention

This is a division of application Ser. No. 66,153, filed Aug. 21 1970, now U.S. Pat. 3,760,037, issued Sept. 18, 1973.

The present invention relates to a process for imparting lasting flame-resistant effects to various combustible materials.

Description of the Prior Art

Various substances have been proposed as flame-resisting additives for combustible materials, such as fibers and plastics. For example, various organic halogen compounds, phosphoric acid esters, halogen-containing phosphoric acid esters, antimony oxide and boric acid salts have been used. Though those substances are effective in general, they are generally water-soluble, low in molecular weight and characterized by ion exchange properties. Further they have the additional defect that if they are added to materials such as fibers and plastics, they can move to the surface of the materials where they are lost or scattered as time elapses, thus reducing or losing the flame-resistant properties. It is known that a Probane treatment in which tetrakishydroxymethyl phosphonium chloride is used, provides lasting flame-resisting effects due to its reactivity with cellulose. However, that process cannot be applied to materials which do not have functional groups. Moreover, that process causes hardening of finished fabrics or emittance of an offensive odor during storage. When conventional low molecular weight flame-resisting agents are used, the physical properties such as tensile strength, flexural strength, abrasion resistance and weather resistance of the fibers of plastics are remarkably reduced, and the hand of woven cloth is inclined to deteriorate remarkably. Further some of low molecular weight flame-resistant agents are poisonous, and the products which have been subjected to a flame-resistant finish with such flame-resisting agents may cause unexpected difficulties when they are brought into contact with the skin. In addition, if low molecular weight flame-resisting agents are used in a wet spin preparation of artificial fibers or semi-synthetic fibers, the low molecular weight flame-resistant agents will not be held in the filaments, but will tend to flow out of the filaments into the coagulation bath as the filaments are being regenerated from the coagulation bath. Consequently, a large quantity of the flame-resistant agents must be added to the spinning solution, which tends to contaminate the coagulation bath and increase the cost and amount of labor required for cleaning the bath.

A variety of high molecular weight agents have been investigated in an effort to avoid the deffects of the low molecular weight flame-resistant agents. For example, as disclosed in the specification of Japanese Patent Publication No. 17,088/1967, flame-resistant agents of phosphonate polymers have been publicly known which are obtained by reacting a ketone with a cyclic chlorophosphite under mild conditions. However, the phosphorus-containing polymers disclosed in that publication have terminal free hydroxyl groups which renders the substance weakly acidic so that it tends to react with alkali to impart water solubility. Products treated with such substances, therefore, are not completely wash-resistant. The presence of terminal alcoholic or acidic hydroxyl groups suggests that the polymers *per se* are reactive, and chemical changes can occur during the course of such operations as dyeing, bleaching and scouring of high molecular materials, such as fibers and plastics, which can cause various problems. Further, phosphine-like substances are inevitably generated from the polymers during these operations, which imparts odor and toxicity to the finished materials.

It is an object of this invention therefore to eliminate the aforementioned defects of such conventionally known flame-resistant agents.

SUMMARY OF THE DISCLOSURE

The process of the present invention is accomplished by applying a phosphorus-containing compound such as an oligomer or polymer, to combustible materials at a temperature below the decomposition point thereof, said phosphorus-containing oligomer or polymer being obtained by reacting a tertiary phosphite (A) of the general formula:

$$(R_1O)_3P \tag{A}$$

a dialkyl phosphite halogenide (B) of the general formula:

$$(R_2O)_2PX \tag{B}$$

a cyclic halogenophosphite (C) of the general formula:

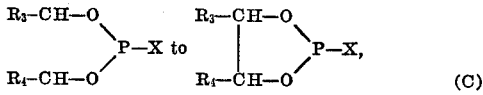

(C)

an aldehyde (D) of the general formula:

$$R_8CHO \tag{D}$$

and a ketone (E) of the general formula:

$$R_9-\underset{\underset{O}{\|}}{C}-R_{10} \tag{E}$$

wherein $R_1$ and $R_2$ represent alkyl groups having 1–4 carbon atoms which may be substituted with chlorine or bromine, X represents chlorine or bromine, $R_3$ through $R_7$ represent hydrogen or methyl groups, $R_8$ represents hydrogen or an alkyl group having 1–3 carbon atoms, and $R_9$ and $R_{10}$ each represent alkyl groups having a total of 2–5 carbon atoms, or $R_9$ and $R_{10}$ together form a cyclohexane ring.

DETAILED DESCRIPTION OF PREFERRED EMBODIMENTS

The standard molar ratio of components (A)–(E) in the preparation of this compound is about 1:1:1–1000:1:1–1000. Preferably (D) is used in an excess amount relative to (A) or (B), and (E) is used in an excess amount relative to (C). (D) is used in an amount of 1–17 moles, preferably 1–1.3 moles, per mole of (B) or (A), and (E) is used in an amount of 1–1.5 moles, preferably 1–1.25 moles per mole of (C).

Suitably tertiary phosphites used in the preparation of these compounds (oligomers and polymers), include trialkyl phosphites such as trimethyl, triethyl, dimethylethyl, tripropyl, triisopropyl and tributyl phosphites, and halogen-containing trialkyl phisphites, such as tris-2-chloroethyl, tris-2-bromoethyl, tris-2,3-dichloropropyl, tris-2,3-dibromopropyl and tris - 2,3 - chlorobromopropyl phosphites.

Suitable dialkylphosphite halogenides, include dimethyl, diethyl, methylethyl, dipropyl, diisopropyl and dibutylphosphite halogenides and dihalogenoalkylphosphite halogenides, such as bis - 2 - chloroethyl, bis - 2 - bromoethyl, bis - 2,3 - dichloropropyl, bis - 2,3 - dibromopropyl and bis - 2,3 - chlorobromopropylphosphites. Halogen-containing trialkyl phosphites and dihalogenoalkyl phosphite halogenides are quite advantageous starting materials from an industrial point of view, since they can be prepared easily at a low price by reacting phosphorus trichloride or phosphorus tribromide with an epoxide of ethylene oxide, propylene oxide or epihalohydrin in the absence or presence of a catalyst, such as magnesium chloride, aluminum chloride or ferric chloride.

Suitable cyclic halogenophosphites include 2 - chloro-1,3,2 - dioxaphospholan, 2 - bromo - 1,3,2 - dioxaphospholan, 2 - chloro - 4 - methyl - 1,3,2 - dioxaphospholan, 2 - bromo - 4 - methyl - 1,3,2, - dioxaphospholan, 2-chloro - 4,5 - dimethyl - 1,3,2, - dioxaphospholan, 2-chloro - 4 - methyl - 1,3,2 - dioxaphospholinan and 2-chloro - 4,5 - dimethyl - 1,3,2, - dioxaphospholinan. Those compounds can be prepared easily by reacting an α-glycol or β-glycol with phosphorus trichloride or phosphorus tribromide at a low temperature with the evolution of hydrogen halide.

Suitable ketones include aliphatic or alicyclic ketones having 6 or less carbon atoms, such as methylethyl ketone and cyclo-hexanone.

Suitable aldehydes include the aliphatic aldehydes having 4 or less carbon atoms, such as formaldehyde, acetaldehyde, propionaldehyde and butylaldehyde and halogen-containing aliphatic aldehydes such as chloral and bromal.

Generally, the reaction of a cyclic halogenophosphite and a ketone proceeds indispensably in the presence of water to form a phosphorus-containing polymer containing a terminal hydroxyl group. However, it has been found that the reaction proceeds smoothly in the absence of water, if a tertiary phosphite, a dialkyl phosphite halogenide, and an aldehyde are incorporated in the reaction system, to turn a phosphorus-containing polymer having a terminal group stabilized with an ester group. The molecular weight of the resulting polymer is reduced as the amounts of the tertiary phosphite, dialkyl phosphite halogenide and aldehyde per cyclic halogenophosphite and ketone are increased. On the other hand, the molecular weight is increased as the amount of the tertiary phosphite, dialkyl phosphite halogenide and aldehyde per cyclic halogenophosphite, and ketone are decreased. The molecular weight therefore can be precisely regulated.

In the preparation of said compounds, a mixture of an aldehyde and a ketone is generally added dropwise at a temperature below ambient temperature, preferably at a temperature of between 0–10° C., into a mixture of a tertiary phosphite, a dialkyl phosphite halogenide and cyclic halogenophosphite. Alternatively, the mixed phosphorus compound may be added dropwise into the aldehyde and ketone mixture. The reaction may be carried out in general in the absence of a solvent or in the presence of an inert solvent, such as carbon tetrachloride or ethane dichloride. In those processes in which the product is subjected to a subsequent procedure, as will be further discussed below, it is convenient to use a solvent having a boiling point which approximates the isomerization temperature, such as ethane tetrachloride or o-dichlorobenzene. The reaction of the mixed phosphorus compounds with the aldehyde and ketone proceeds smoothly in a slightly exothermic manner during which the reaction mixture becomes gradually more viscous or glassy-solid. Thus the resulting phosphorus compound contains phosphorus in the form of pentavalent phosphonate and trivalent phosphite.

It was observed by means of a nuclear magnetic resonance spectrum, that if the compound of this invention is subjected to thermal isomerization, the trivalent phosphorus is completely converted into a pentavalent phosphonate type. The isomerization is performed at a temperature in the range of 100–200° C., preferably 140–170° C. for from 30 minutes to 10 hours, preferably 2–3 hours. A slight, but not vigorous, heat generation is observed. The isomerization may be performed either in the absence of a solvent or in the presence of a solvent having an adequate boiling point as above, such as ethane tetrachloride or o-dichlorobenzene. Inert solvents suitably used in the isomerization include, in addition to the above compounds, cumene, pseudocumene, mineral spirit, xylene, turpentine oil, para-cymene and Decalin. A compound having a relatively low boiling point, such as toluene or trichloroethylene may also be used together with the above solvents in a small amount (about 10–20%). The products may be used either before or after the thermal isomerization in the present invention.

Although the structure of the phosphorus-containing compound obtained in the above described manner is not completely understood, it is believed that it corresponds to the following structure, based on the fact that no free hydroxyl groups are detected. The terminal groups are stabilized by an ester group.

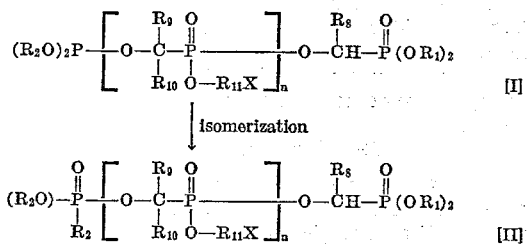

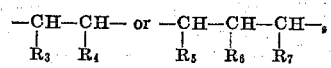

wherein $n$ represents an integer of 1–1000, $R_{11}$ represents a group of $$-\underset{\underset{R_3}{|}}{\overset{\overset{}{|}}{C}}H-\underset{\underset{R_4}{|}}{\overset{\overset{}{|}}{C}}H- \text{ or } -\underset{\underset{R_5}{|}}{\overset{\overset{}{|}}{C}}H-\underset{\underset{R_6}{|}}{\overset{\overset{}{|}}{C}}H-\underset{\underset{R_7}{|}}{\overset{\overset{}{|}}{C}}H-,$$

and $R_1$ through $R_{10}$ have the same meanings as above.

The decomposition points of the phosphorus-containing compounds measured, according to differential thermal analysis, will vary depending upon the molecular weight. In general, the decomposition point is increased as the molecular weight is increased; [I] being around 200° C. and [II] being around 200–250° C. The phosphorus-containing compounds are preferably applied to combustible materials at a temperature below their decomposition points.

Various materials can be finished according to the process of the present invention including fibers, synthetic resins and various raw materials. For instance, treatable fibers include natural fibers, such as cotton, silk, wool and hemp; artificial fibers, such as filaments made according to viscose method or cuprammonium process; staple fiber and cellulose acetate; and synthetic fibers, such as polyamides, polyolefins, polyesters, polyacrylics and vinylon, and mixed yarns and blended fabrics thereof. Synthetic resins include polyolefins, polystyrenes, polyethers, polyamides, polyacrylics, epoxides, alkyds, polyurethanes, polyvinyl chloride and cellulose esters. They may be in the form of molded compositions, extruded compositions, films, sheets, and surface-constructing compositions, coating compositions, foams and rubbery compositions. Further, not only the finished artificial or synthetic fibers can be treated according to this invention, but also spinning solutions (dope) or emulsions can be treated as well. As for coating compositions, the original solutions thereof may be also deemed as substrates. In addition, printing papers, packing-papers, cardboards, woods, compressed plates and saw-dust may be included. The combustible materials of the present invention are intended to include all of the above materials. There is no strict limitation on the quantity of phosphorus-containing compounds which can be suitably used in carrying out the process of the present invention. They are effective, however, in amounts of at least 1–2% by weight (solid standard) based on combustible materials, with the maximum amount being above 50% by weight.

The phosphorus-containing compound may be applied to the above various combustible materials by spraying, impregnation, coating or mixing. The phosphorus-containing compounds of the present invention are in the form of viscous liquids or glassy-solids depending upon the particular molecular weight. They are all soluble in low aliphatic alcohols, such as methanol and ethanol, acetone, methylethyl ketone; and halogenated hydrocarbons, such as ethane dichloride and trichlene. Thus the phosphorus-containing compounds of the present invention without dilution, or in a suitably diluted form, can be applied to natural, artificial or synthetic fibers by spraying or immersion to obtain flame-resistant finished products which have good wash and dry cleaning resistance.

If the phosphorus-containing compounds of the present invention are diluted with a suitable solvent and vigorously stirred together with an activating agent with a homomixer or homogenizer, stable emulsions are obtained. Impregnation of fibers with the emulsions constitutes an advantageous finishing method. In dry and wet spinning processes, lasting flame-resistant fibers having excellent physical properties can be obtained by adding a phosphorus-containing compound of the present invention, without dilution or in a diluted form, with a suitable solvent dope or spinning emulsion to obtain a dispersion or solution of the phosphorus-containing compound. The dispersion or emulsion is then subjected to a spinning operation. The phosphorus-containing compounds can be applied directly to general synthetic resins or can be mixed with the resins. They are characterized by good compatibility with many polymeric materials and are capable of imparting excellent flame resistance, plasticization and transparency to these materials. They also have some effect in enhancing the shrinkage and dimensional stability of the polymeric materials during molding.

Fibers treated with the phosphorus-containing compounds of the present invention are stable against almost all types of conventional after-treatments to which fibers and fabrics are usually subjected, such as water washing, bleaching, scouring, dyeing, softening, resin treatment and curing, and the use of the materials of this invention does not require any special procedures. Their use does not result in any deleterious contamination of the scouring bath owing to scattering or to reattachment of scattered substance to cloth.

No special temperature limitations are required in carrying out the process of the present invention. The phosphorus-containing compounds of the present invention are quite stable and are characterized by decomposition points of generally above 200° C. The compounds can be used at temperatures ranging from ambient temperature up to the temperature of decomposition. However, it is to be noted that when the phosphorus-containing compounds of the present invention are used in the form of a solvent solution, the use temperature should be below the boiling point of the solvent.

There are no special procedural requirements as far as the particular quantity of phosphorus-containing compound used. The desirable effects are generally obtainable by using the compounds in an amount of at least about 1–2% by weight (solid standard) based on combustible materials, the maximum amount being about 50% by weight.

The materials of the present invention can be used in combination with an amino resin, a phenolic resin, an epoxy resin, etc., depending upon the particular finishing requirements. The materials and technique of the present invention provide the following advantageous characteristics:

(1) The flame-resistant effects are stable against water washing and dry cleaning.
(2) The toxicity is very low.
(3) The products are odorless.
(4) The finished products have good stability to sunlight and no color change is observed.
(5) The dyeability of the materials being finished is not adversely affected.

The process of the present invention will be illustrated below with reference to the following Examples which are provided herein for purposes of illustration only.

In those Examples, parts and percentages are given by weight.

REFERENCE EXAMPLE 1

Preparation of phosphorus-containing compounds 1 and 2

In a four-necked flask provided with thermometer, stirrer, condenser and dropping funnel, tris (2-chloroethyl) phosphite, bis(2-chloroethyl) phosphochloridite and 2-chloro - 4 - methyl - 1,3,2 - dioxaphospholan were charged in amounts listed in Table 1. At a temperature below 10° C. while stirring, a mixture of acetaldehyde and acetone in amounts listed in Table 1 was added dropwise therein. After completion of the addition, the mixture was allowed to stand while stirring for 2 hours or overnight and then heated to 50–80° C. under a reduced pressure of 5–10 mm. Hg to remove volatile components. Yields and molecular weights of the resulting phosphorus-containing polymers of phosphonate-phosphite type are shown in Table 1.

TABLE 1

| Reaction components and results | Compound No. 1 | Compound No. 2 |
|---|---|---|
| Tris(2-chloroethyl) phosphite, g. (molar ratio) | 40 (1) | 27 (1) |
| Bis(2-chloroethyl) phosphorochloridite, g. (molar ratio) | 34 (1) | 23 (1) |
| 2-chloro-4-methyl-1,3,2-dioxaphospholan, g.(molar ratio) | 84 (4) | 84 (6) |
| Acetaldehyde, g. (molar ratio) | 10 (1.53) | 7 (1.56) |
| Acetone, g. (molar ratio) | 44 (5) | 44 (7.5) |
| Yield (after concentration under reduced pressure), g. | 188 | 175 |
| Molecular weight (after concentration under reduced pressure) | 1,260 | 1,680 |
| Product: | | |
| P, percent | 14.8 | 15.0 |
| Cl, percent | 21.3 | 21.5 |

NOTE.—Molar ratio is based on tris(2-chloroethyl) phosphite as 1.

REFERENCE EXAMPLE 2

Preparation of phosphorous compounds 3 to 5

The reaction components listed in Table 2 were reacted in the same manner as in Reference Example 1. After concentration under reduced pressure, the resulting phosphorus-containing compounds of phosphonate-phosphite type, without any treatment, were isomerized at 140–150° C. for 2–3 hours. The products were colorless honey-like or glassy solids. Yields and molecular weights are shown in Table 2.

TABLE 2

| Reaction components and results | Compound No. | | |
|---|---|---|---|
| | 3 | 4 | 5 |
| Tris(2-chloroethyl) phosphite, g. (molar ratio) | 121 (1) | 81 (1) | 59 (1) |
| Bis(2-chloroethyl) phosphorochloridite, g. (molar ratio) | 101 (1) | 68 (1) | 50 (1) |
| 2-chloro-4-methyl-1,3,2-dioxaphospholan, g. (molar ratio) | 2,086 (33) | 2,028 (48) | 2,163 (70) |
| Acetaldehyde, g. (molar ratio) | 31 (1.56) | 21 (1.56) | 15 (1.54) |
| Acetone, g. (molar ratio) | 1,075 (41.2) | 1,045 (60) | 1,115 (87) |
| Yield (after isomerization under heating), g. | 2,980 | 3,080 | 3,100 |
| Molecular weight (after isomerization under heating) | 6,700 | 9,800 | 14,500 |
| Product: | | | |
| P, percent | 15.3 | 15.2 | 15.7 |
| Cl, percent | 22.0 | 22.5 | 21.3 |

NOTE.—Molar ratio is based on tris(2-chloroethyl) phosphite as 1.

REFERENCE EXAMPLE 3

Preparation of phosphorus-containing compounds 6 and 7

Phosphorus-containing compounds were prepared in the same manner as in Reference Example 1 except that bromium-containing phosphorus compounds were used in place of the chlorine-containing phosphorus compounds. The resulting phosphorus-containing polymers were faint yellow viscous honey-like solids. Yields and molecular weights are shown in Table 3.

TABLE 3

| Reaction components and results | Compound No. | |
|---|---|---|
| | 6 | 7 |
| Tris(2-bromoethyl) phosphite, g. (molar ratio) | 81 (1) | 81 (1) |
| Bis(2-bromoethyl) phosphorobromidide, g. (molar ratio) | 72 (1) | 72 (1) |
| 2-bromo-4-methyl-1,3,2-dioxaphospholan, g. (molar ratio) | 1,850 (50) | 2,959 (80) |
| Acetaldehyde, g. (molar ratio) | 14 (1.56) | 14 (1.56) |
| Acetone, g. (molar ratio) | 726 (625) | 1,161 (100) |
| Yield (after isomerization under heating), g. | 2,530 | 3,940 |
| Molecular weight (after isomerization under heating) | 13,000 | 21,000 |
| Product: | | |
| P, percent | 12.9 | 12.8 |
| Br, percent | 35.0 | 34.2 |

NOTE.—Molar ratio is based on tris(2-bromoethyl) phosphite as 1.

EXAMPLE 1

A filter paper of 100% cellulose pulp of 173 g./m.² was impregnated with a solution prepared by mixing 10 parts of compound (3) in Reference Example 2, 16.7 parts of 60% resol-type phenolic resin soluble in methanol and 73.3 parts of methanol, squeezed uniformly with a roll to pickup 200%, dried at 90° C. for 5 minutes, subjected to heat treatment at 120° C. for 3 minutes and finally hardened at 150° C. for 15 minutes. The paper thus finished had a carbonized area of 25 cm.² in the flame-proof test according to JIS Z–2150 and the times for lingering of flame and embers were both zero. The rupture strength of the finished paper was 1.8 kg./cm.² (the strength of paper not containing compound 3 was 1.5 kg./cm.² and that of unfinished base paper was 0.4 kg./cm.²). There was not observed odor, remarkable coloring or stickiness. Substantial reduction in flame-resistant effect or tear strength was not recognized after finished paper was immersed in water at ambient temperature for 100 hours and dried.

EXAMPLE 2

A plain weave curtain fabric of spun rayon having a weight of 210 g./m.² was impregnated with solution prepared by dissolving 20 parts of compound (5) in Reference Example 2, 1.5 parts of methylhydrodienepolysiloxane having degree of polymerization of 50 and 0.5 part of zinc octenoate in 78 parts of trichloroethylene. The fabric was squeezed with an iron roll to pickup 100%, air-dried at 80° C. for 5 minutes and subjected to heat treatment at 120° C. for 5 minutes. The fabric thus finished had a carbonized area of 30 cm.². The lingering of flame and embers times were both zero in the flame-proof test according to JIS Z–2150. The finished fabric was soft. Water-repellency according to AATCC spray test was 100. As for flame-resistant effect after washing three times according to JIS L–1042 F–1, the carbonized area was 33 cm.² and the times for lingering of flame and embers were both zero.

EXAMPLE 3

In 40 parts of compound (1) in Reference Example 1, 3.5 parts of polyoxyethylene nonylphenol ether having 60 moles of ethylene oxide added and 2.5 parts of polyoxyethylene nonylphenol ether phosphoric ester were added. The mixture was then added with 54 parts of water dropwise while stirring to obtain an emulsion, which was treated with Eppenbach homogenizer to obtain stable emulsified dispersion having average particle diameter of 1–1.5 microns. 40 parts of the emulsified dispersion thus obtained was diluted with 60 parts of water and sprayed on a wallpaper of viscose straw yarn lined with paper with a spray gun at the ratio of 100 g./m.². The wallpaper was dried at 80° C. for 5 minutes. When a match was allowed to come near the surface of the wallpaper applied to wall, no flame spread was observed but carbonization of area contacted with flame.

EXAMPLE 4

On a parting paper applied with silicone resin, mixture of 15 parts of the emulsified dispersion of Example 3, 85 parts of 45% aqueous dispersion of emulsion copolymer of ethyl acrylate, acrylonitrile, acrylic acid and acrylamide in the ratio of 88:6:3:3 (by weight), 5 parts of methylated methylolmelamine and 0.5 part of an organic amine hydrochloride was cast. After drying and heat treatment, the resulting film was transparent and non-combustible. The mixture was quite useful as adhesive for noncombustible non-woven fabric, flocky finished cloth and lined cloth.

EXAMPLE 5

15 parts of a copolymer obtained by pearl polymerization having composition of 84 parts of ethyl acrylate, 15 parts of acrylonitrile and 1 part of β-hydroxyethyl methacrylate, 15 parts of compound (6) in Reference Example 3 and 70 parts of toluol were mixed together to obtain homogeneous viscous solution having viscosity according to Broodfield viscosimeter of 19,000 centipoises. In 90 parts of the solution, 10 parts of antimony trioxide were added and the mixture was stirred to obtain a homogeneous paste. The paste was then mixed with 1 part of butylated methylolmelamine. Both faces of a vinylon-cotton canvas were coated with the pasty mixture in the amount of 120 g./m.² and air-dried at 100° C. In a flame-proof test according to a vertical test method of AATCC, the thus finished canvas had a carbonized distance of 10 cm. and the times for lingering of flame and embers were both zero. The flame-proof property was stable against water. No odor or remarkable hardening in handling was observed in the finished canvas. It was particularly suitable for tent or sheets to be used in transportation.

EXAMPLE 6

2.5 parts of compound (5) in Reference Example 2, 25 parts of cellulose acetate (degree of acetylation: 52%) and 72.5 parts of acetone were mixed to obtain a homogeneous solution, which was then spun under a spinning pressure of 20 kg./cm.² at 120 denier (32 filaments), oil-twisted in the usual manner and reeled. The resulting cellulose acetate filament was woven into a cloth. After scouring, the cloth was shown to be noninflammable. Only portions brought into contact with the flame were observed to melt. There was observed neither odor nor irritation. The cloth did not undergo any significant color change in exposure to sunlight and did not lose its flame-proof property by repeated domestic washing.

EXAMPLE 7

Emulsified dispersion obtained by mixing 100 parts of compound (5) in Reference Example 2 with 6 parts of polyoxyethylene nonylphenol ether emulsifier and 44 parts of water was added to viscose having a cellulose concentration of 8% at the ratio of cellulose:compound (5)=100:20. The mixture was spun into a Muller's bath and scoured and dried in a usual manner.

The results of test of the product are shown in Table 4.

EXAMPLE 8

Solution of 100 parts of compound (4) in Reference Example 2 in 30 parts of ethane dichloride was added to a viscose solution having a cellulose concentration of 8% at the ratio of cellulose:compound (4)=100:20. Spinning and finishing were carried out in the same manner as in Example 7.

The test results of the product are shown in Table 4.

EXAMPLE 9

Compound (2) in Reference Example 1 was added to a viscose having a cellulose concentration of 8% at the ratio of cellulose:compound (2)=100:20. Spinning and finishing were carried out in the same manner as in Example 7.

The test results of the product are shown in Table 4.

EXAMPLE 10

Spinning and finishing were carried out in the same manner as in Example 9 except that 30 parts of compound (6) in Reference Example 3 were used instead of 20 parts of compound (2) per 100 parts of cellulose. The test results of the product are shown in Table 4.

EXAMPLE 11

Spinning and finishing were carried out in the same manner as in Example 10 except that 40 parts, not 30 parts, of compound (6) were used. The test results are show in Table 4.

of ASTM D–572–50 was 10, and index of refraction was $n_D^{25}$=1.50 (1.59). Degree of hygroscopicity according to the description of ASTM D–570–42 during 24 hours was 0.002% (0.001%). Coloration after irradiation with a Fade-Ometer for 300 hours was negligible. If the molded good containing said compound placed on a wire-netting was heated to set fire from below, the molded good melted but did not burn up, while the molded good not containing said compound burned in a flame and melted.

EXAMPLE 13

10 parts of compound (5) in Reference Example 2 were mixed with 10 parts of tricresyl phosphate to obtain a homogeneous solution. 20 parts of the mixture was mixed with 100 parts of 50% emulsion of polyvinyl acetate (viscosity: 15,000 cps., containing 7% of polyvinyl alcohol as protective colloid but no plasticizer) to obtain a homogeneous solution. Dry film prepared from the mixture was carbonized but did not burn when it was brought into contact with a flame. The film was flexible and had good transparency and properties suitable for adhesive for flame-proofing wallpapers and printing binders. The film prepared from said mixture was resistant to sunlight and was excellent as a flame-resistant painting resin.

EXAMPLE 14

4 parts of compound (6) in Reference Example 3 were added in a mixture of 100 parts of 35% solution of linear polyester urethane polymer having reactive OH group at the terminal in ethyl acetate (trade name: Crisvon N–183, a product of Dainihon Ink Kagaku Kogyo Co., Ltd.), and 6 parts of polyfunctional polyisocyanate cross-linking agent (trade name: Crisvon N–189) and 6 parts of an accelerator for urethanation reaction (trade name: Crisvon Accel, a product of Dainihon Ink Kagaku Kogyo Co., Ltd.) and the whole was mixed homogeneously. A silicone paper was applied with the mixture and dried at 120° C. for 5 minutes to obtain a film having a thickness of 0.25 mm. For comparision a similar treatment was effected without using said compound. Figures in parentheses given below are for the cases wherein said com-

TABLE 4

| Items | Carbonization (percent) | Time for lingering of flame (second) | Time for embers (second) | Dry strength (g./d.) | Dry elongation (percent) | Nodular strength (g./d.) |
|---|---|---|---|---|---|---|
| Examples: | | | | | | |
| 7 | 85 | 0 | 0 | 2.71 | 20.0 | 1.50 |
| 8 | 79 | 0 | 0 | 2.77 | 20.3 | 1.60 |
| 9 | 62 | 0 | 0 | 2.87 | 20.5 | 1.64 |
| 10 | 89 | 0 | 0 | 2.49 | 20.5 | 1.60 |
| 11 | 92 | 0 | 0 | 2.41 | 21.4 | 1.66 |
| Common rayon | 2 | 150 | 195 | 2.80 | 18.1 | 1.60 |

NOTE 1.—Proportion by weight of remaining carbonized part after heating from ambient temperature to 500° C. in a microthermobalance device for differential thermal analysis was taken as carbonization percentage.

NOTE 2.—25 mm. butane gas flame was brought in contact with a bundle of filament and times for lingering of flame and time for embers after removal of the flame were measured.

EXAMPLE 12

95 parts of polystyrol having an average degree of polymerization of about 1000 and an average particle diameter of 0.6 mm., obtained by bulk polymerization in batch were blended and kneaded with 5 parts of compound (3) in Reference Example 2 and the mixture was heated to melt and subjected to injection molding. Temperature of the injection molding cylinder was 220° C. and the injection pressure was about 900 kg./cm.² For comparison, the similar finishing was effected without using compound (3). Figures in parenthese are for the cases wherein compound (3) was not used in the following descriptions. Rockwell hardness of the molded good was M–70 (M–80), tensile strength according to the description of ASTM D–638–58T was 431.3 kg./cm.² (509.5 kg./cm.²) and tensile elongation was 1.3% (1.8%). Degree of cloudiness of the molded good caused by the incorporation of the compound according to the description pound was not used. Tensile strength of the film was 340 kg./cm.² (355 kg./cm.²) and elongation was 740% (730%). The film obtained according to the process of the present invention had excellent transparency and softness and very slight stickiness. If the film finished according to the process of the present invention was brought into contact with a flame, it only melted, but did not burn, while the film not containing said compound burned. The flame-proof property of the film of the present invention was not lost by immersion in water.

EXAMPLE 15

Water was added to 30 parts of the emulsified dispersion in Example 3 to make the total weight 100 parts. A roll of curtain lace made of polyester synthetic filament (polyethylene glycol terephthalate) dyed in black was immersed in the mixture, squeezed to pickup 100% and heat-treated at 130° C. for 3 minutes. The roll thus finished gave results of 7 times in flame-contact test effected according to combustion test (coil method) described in the Official Gazette (Extra Edition No. 22) published on Mar. 28, 1969, while nonfinished roll gave the results of 2 times. The finished cloth was then subjected to washing three times wherein the cloth was washed in a domestic electric washing machine with 0.2% soap solution at 40° C. for 20 minutes, rinsed with cold water for 5 minutes and dried. The flame-proof effect of the cloth was not lost after the wash treatment.

EXAMPLE 16

The test for finished material was effected in the same manner as in Example 15 by using an emulsified dispersion obtained by emulsifying 40 parts of oligomer mixture composed of 50% of compound (6) in Reference Example 3 and 50% of compound (2) in Reference Example 1 in the same manner as in Example 3. Flame-proof effect and resisatnce to wash stood comparison with those of emulsified dispersion in Example 16, 8 parts of reactive wrinkle-proof agent of dimethylolethylene urea cellulose, 2 parts of 80% aqueous solution of methyletherified trimethylol melamine, 2 parts of acid catalyst of an organic amine hydrochloride (trade name: Catalyst 376, a product of Dainihon Ink Kagaku Kogyo Co., Ltd.) and 38 parts of water. The fabric was then squeezed to pickup 80% with a roll, dried at 90° C. for 5 minutes and heat-treated at 140° C. for 5 minutes.

The results are shown in Table 5.

EXAMPLE 21

Test was effected under the same conditions as in Example 20 except that 10 parts of water was reduced from the treating solution and 10 parts of flame-resisting agent of methylol compound of dimethylphosphonopropionamide were added instead. The results are shown in Table 5.

TABLE 5

| | Item | | | | | | |
|---|---|---|---|---|---|---|---|
| | Flame-proof test according to JIS Z-2150 | | | | | Wrinkle resistance | Tear strength |
| | Carbonized area (cm.$^2$) | Time for lingering of flame (second) | Time for embers (second) | Carbonized area after the first wash (cm.$^2$) | Carbonized area after the third wash (cm.$^2$) | Longitudinal direction (percent) | Longitudinal direction (g.) |
| Examples: | | | | | | | |
| 19 | 28 | 0 | 0 | 38 | 44 | 38 | 950 |
| 20 | 23 | 0 | 0 | 28 | 33 | 66 | 670 |
| 21 | 15 | 0 | 0 | 28 | 20 | 70 | 620 |
| Poplin not treated | (a) | 1 | 0 | (a) | (a) | 39 | 960 | a Entirely destroyed.

NOTE 1.—Conditions for wash were according to JIS L-1041.
NOTE 2.—Degree of wrinkle resistance was measured according to JIS.
NOTE 3.—Tear strength was measured according to tear test of JIS.

Example 15. As for handling of the finished roll, stickiness was low as compared with that of Example 15.

EXAMPLE 17

A mixture of 70 parts of compound (6) in Reference Example 3 and 30 parts of tricresyl phosphate was emulsified under the same conditions as in Example 3 to obtain stable emulsified dispersion. The emulsified dispersion was subjected to a finishing test in the same manner as in Example 15. Flame-proof effect of the finished cloth stood comparison with that of Example 15. The hand of the finished cloth was not sticky and was as pleasing as in Example 16.

EXAMPLE 18

In 100 parts of unsaturated polyester resin (trade name: Polylite 8007, a product of Dainihon Ink Kagaku Kogyo Co., Ltd.), 10 parts of compound (7) in Reference Example 3 and 1 part of 55% solution of methylethyl ketone peroxide in dimethylphthalate were added. Square plates of side of 30 cm. having thickness of 3 mm. were molded at about 40° C., allowed to stand for 30 minutes, cured to about 60° C. for 8 hours and finally cured at 100–110° C. for about 2 hours. Flame-proof tests were effected according to the description of JIS A-1322. After heating for 30 seconds, 1 minute, 2 minutes and 3 minutes, the time for lingering of flame was zero. The flame was extinguished directly after removal from the burner. In any period of heating, the flame length was less than 15 cm.

EXAMPLE 19

A roll of scoured and bleached cotton poplin weighing 153 g./m.$^2$ was impregnated with a solution of 50 parts of emulsified dispersion of Example 16 diluted with 50 parts of water, squeezed with a roll to pickup 80% and dried in hot air at 120° C. for 5 minutes. The results are shown in Table 5.

EXAMPLE 20

Cotton fabric the same as that in Example 19 was immersed in solution prepared by adding in 50 parts of

Having now fully described the invention, it will be apparent to one of ordinary skill in the art that many changes and modifications can be made thereto without departing from the spirit or scope thereof.

Accordingly, what is intended to be covered by Letters Patent is:

1. A process for imparting a flame-resistant finish to combustible materials which comprises applying a phosphorus-containing compound to said combustible materials at a temperature below the decomposition point of said phosphorus compound, said phosphorus-containing compound being obtained by reacting at a temperature of 0–10° C. a tertiary phosphite of the general formula:

$$(R_1O)_3P, \qquad (A)$$

a dialkyl phosphite halogenide of the general formula:

$$(R_2O)_2PX, \qquad (B)$$

a cyclic halogenophosphite of the general formula:

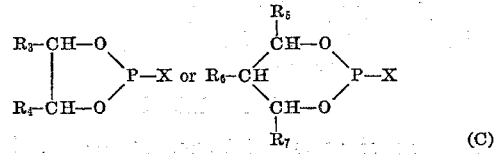

(C)

an aldehyde of the general formula:

$$R_8CHO \qquad (D)$$

and a ketone of the general formula:

(E)

wherein $R_1$ and $R_2$ represent an alkyl group having 1–4 carbon atoms which may be substituted with chlorine or bromine, X represents chlorine or bromine, $R_3$ through $R_7$ represent hydrogen or methyl, $R_8$ represents hydrogen or an alkyl group having 1–3 carbon atoms, and $R_9$ and $R_{10}$ each represent alkyl groups having a total of 2–5 carbon atoms, or $R_9$ and $R_{10}$ together form a cyclohexane ring wherein the molar ratio of components (A)–(E) in the preparation of the phosphorous compound is about 1:1:1–1000:1:1–1000.

2. The process of Claim 1 wherein said phosphorus-containing compound is a polymer.

3. The process of Claim 1 wherein said phosphorus-containing compound is an oligomer.

4. The process of Claim 1 wherein a mixture of said aldehyde and said ketone is added to a mixture of a tertiary phosphite, a dialkyl phosphite halogenide and a cyclic halogenophosphite at a temperature of between 0–10° C.

5. The process of Claim 1 wherein the reaction product of (A) to (E) is a trivalent phosphorus compound which is further subjected to thermal isomerization wherein said trivalent phosphorus compound is converted into a pentavalent phosphonate wherein said isomerization is carried out by heating said reaction product for a period of from 30 minutes to 10 hours at a temperature of from 100° C. to 200° C.

6. A phosphorus-containing compound of the formula

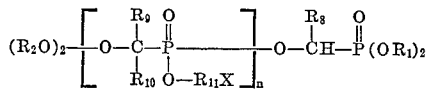

wherein $n$ represents an integer of 1–1000, $R_{11}$ represents a group of

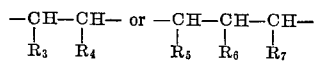

and $R_1$ and $R_2$ represent alkyl groups having 1–4 carbon atoms which may be substituted with chlorine or bromine, X represents chlorine or bromine, $R_8$ represents hydrogen or an alkyl group having 1–3 carbon atoms, and $R_9$ and $R_{10}$ each represent alkyl groups having a total of 2–5 carbon atoms or $R_9$ and $R_{10}$ together form a cyclohexane ring.

7. A pentavalent phosphonate of the formula

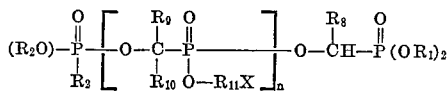

wherein $n$ represents an integer of 1–1,000, $R_{11}$ represents a group of

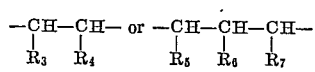

and $R_1$ and $R_2$ represent alkyl groups having 1–4 carbon atoms which may be substituted with chlorine or bromine, X represents chlorine or bromine, $R_8$ represents hydrogen or an alkyl group having 1–3 carbon atoms, and $R_9$ and $R_{10}$ each represent alkyl groups having a total of 2–5 carbon atoms or $R_9$ and $R_{10}$ together form a cyclohexane ring.

8. The process for preparing a trivalent phosphorus-containing compound which comprises reacting a tertiary phosphite of the general formula:

$$(R_1O)_3P, \qquad (A)$$

a dialkyl phosphite halogenide of the general formula:

$$(R_2O)_2PX, \qquad (B)$$

a cyclic halogenophosphite of the general formula:

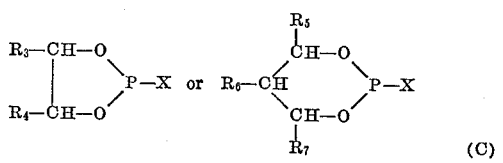

(C)

an aldehyde of the general formula:

$$R_8CHO \qquad (D)$$

and a ketone of the general formula:

(E)

wherein $R_1$ and $R_2$ represent an alkyl group having 1–4 carbon atoms which may be substituted with chlorine or bromine, X represents chlorine or bromine, $R_3$ through $R_7$ represent hydrogen or methyl, $R_8$ represents hydrogen or an alkyl group having 1–3 carbon atoms, and $R_9$ and $R_{10}$ each represent alkyl groups having a total of 2–5 carbon atoms, or $R_9$ and $R_{10}$ together form a cyclohexane ring wherein said reaction is effected at a temperature of from 0° to 10° C. while stirring for a period of from 2 hours to overnight, then heating to a temperature in the range of from 50° to 80° C. under a reduced pressure in the range of from 5 to 10 mm. Hg for a period sufficient to remove volatile compounds.

References Cited
UNITED STATES PATENTS 2,967,787  1/1961  Murphy _____ 117—62
3,247,015  4/1966  Zimmerman et al. _____ 117—137

LESTER L. LEE, Primary Examiner

U.S. Cl. X.R.

117—137; 162—159; 260—45.7 P, 931, 968, 969, DIG 24